UNITED STATES PATENT OFFICE.

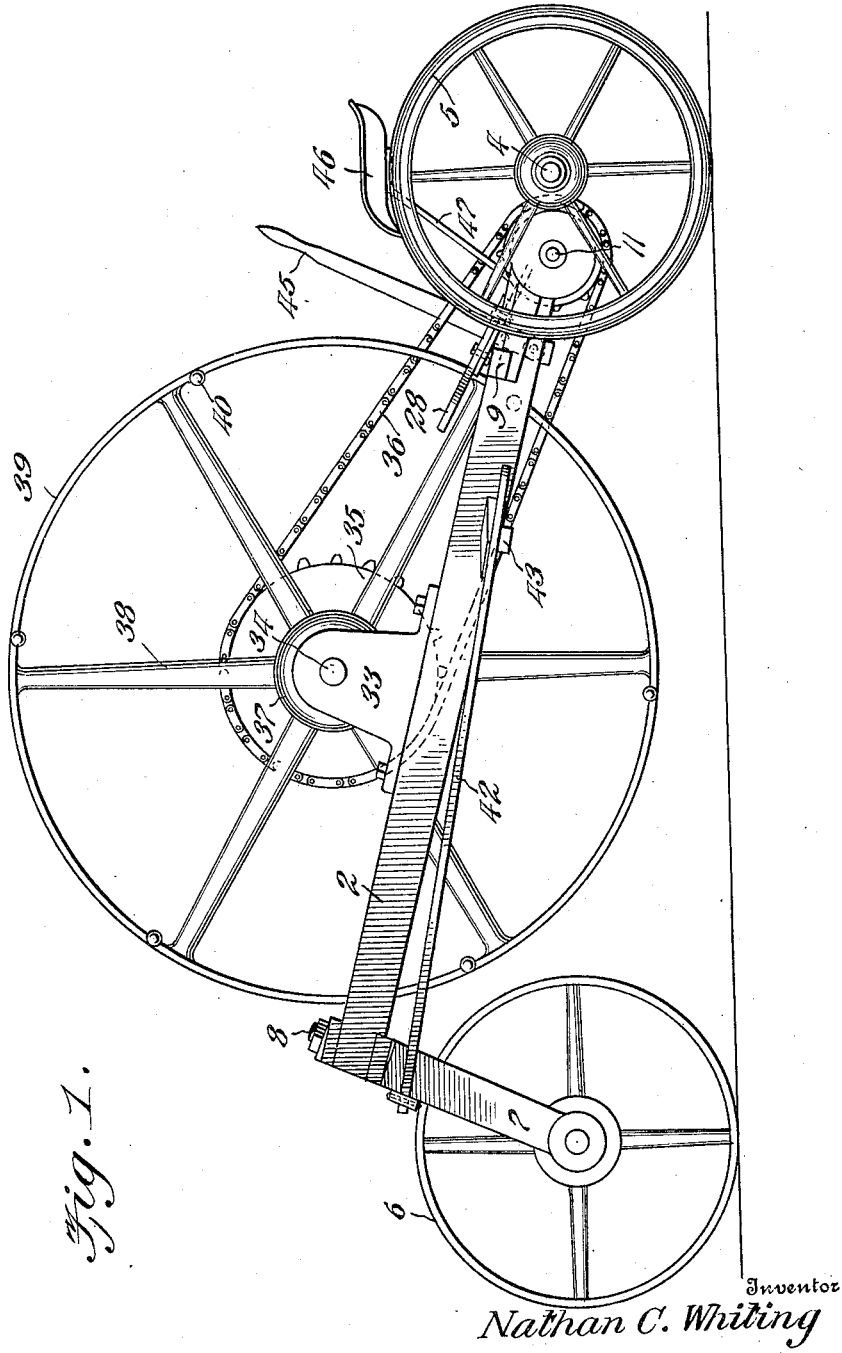

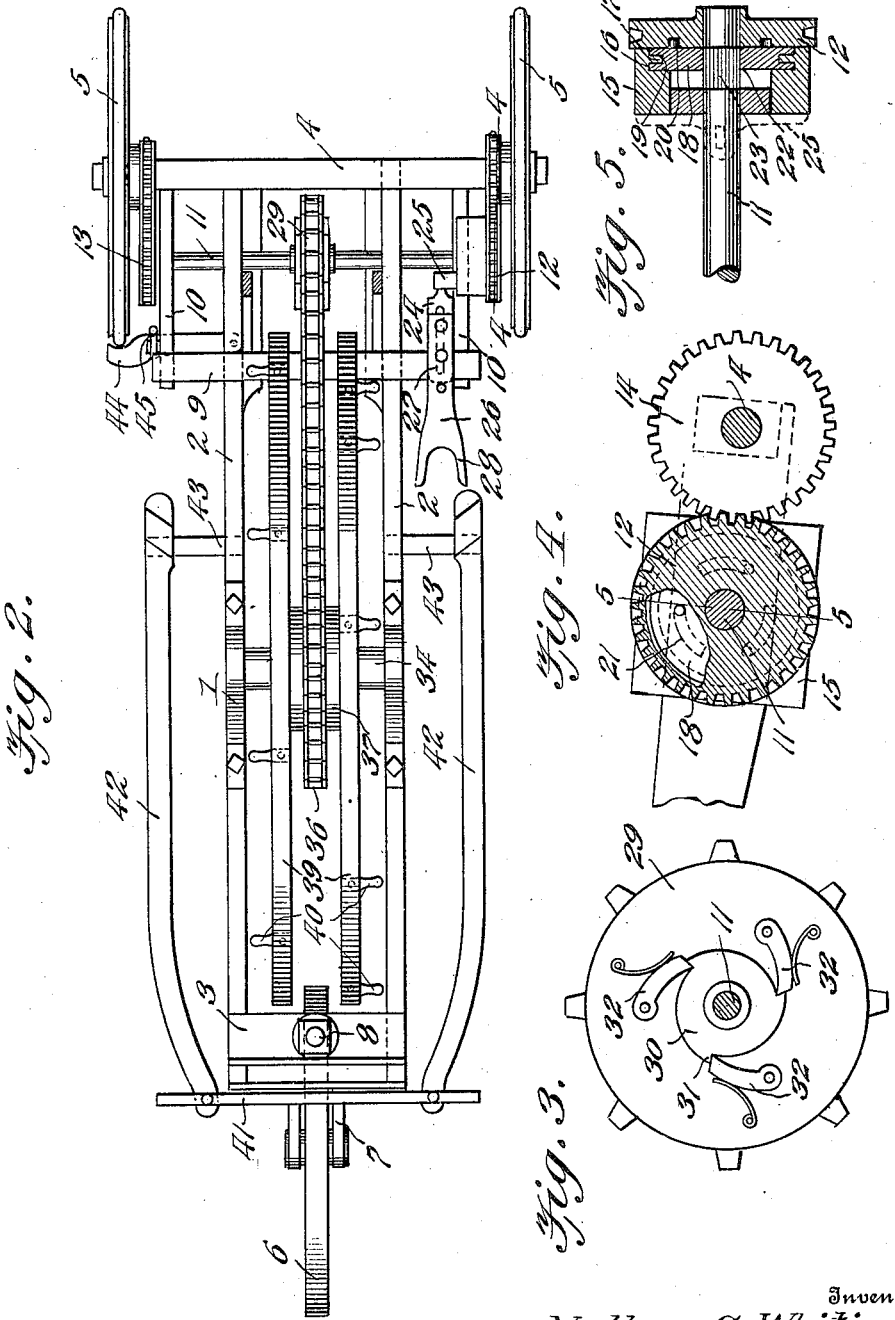

NATHAN C. WHITING, OF GLOUSTER, OHIO.

VEHICLE.

No. 914,212.      Specification of Letters Patent.      Patented March 2, 1909.

Application filed February 19, 1908. Serial No. 416,710.

*To all whom it may concern:*

Be it known that I, NATHAN C. WHITING, a citizen of the United States, residing at Glouster, in the county of Athens and State of Ohio, have invented new and useful Improvements in Vehicles, of which the following is a specification.

The invention relates to an improvement in vehicles, being particularly directed to a vehicle of the tricycle type adapted to be operated by a hand driven power wheel.

The main object of the present invention is the production of a vehicle in which the power is initially supplied by hand driven power wheels connected directly with the main sprocket, the construction including a means for controlling the positive driving of one or both ground wheels.

The invention will be described in the following specification, reference being had particularly to the accompanying drawings, in which:—

Figure 1 is a side elevation of a vehicle constructed in accordance with my invention. Fig. 2 is a plan of the same. Fig. 3 is a side elevation of the driven sprocket, the sprocket shaft being shown in section. Fig. 4 is an enlarged sectional view on the line 4—4 of Fig. 2. Fig. 5 is a sectional view on the line 5—5 of Fig. 4.

Referring particularly to the drawings, my improved vehicle comprises a main frame 1 including spaced parallel side bars 2 connected at their forward ends by a transverse bar 3 and at their rear ends by the rear axle 4, which projects beyond the respective side bars and is terminally formed for the reception of the rear wheels 5. The vehicle is of the velocipede type in which a single or forward guiding wheel 6 only is used, which wheel is revolubly supported in a frame 7 designed to underlie the forward cross bar 3 of the main frame and connected thereto through the medium of a pivot or king bolt 8, whereby the forward wheel 6 may be utilized as a steering wheel for the vehicle and operated in a manner to be later described.

Secured upon the side bars of the main frame in advance of the axle 4 is a cross bar 9, which projects beyond the side bars 2 and is connected at its ends with the axle 4 through longitudinal frame bars 10, said frame bars projecting in spaced parallel relation with the side bars and serving in conjunction with said side bars as an additional support for the operating parts of the vehicle. Mounted in parallel relation with the axle 4 and supported in suitable bearings in the frame bars 10 and in the side bars 2 is a shaft 11, which will be hereinafter referred to as the driven shaft. On the ends of this shaft, which extends beyond the respective frame bars 10, are fixed box gear wheels 12 and 13 respectively, the former of which is loose upon the shaft, while the latter is fixed thereon. The inner end of the hub of each wheel 5 carries a gear 14 designed to be directly engaged by the respective box gears, so that operation of the driven shaft will tend to revolve the wheels and thereby propel the vehicle. One of the box gears 12 is free upon the driving shaft and to provide a desirable form of clutch whereby this loose gear may be fixed to the shaft at the will of the operator I rotatably support upon the shaft a box member 15, the face of which next the box gear 12 is formed with a circular opening 16 having a peripheral inwardly extending rib 17. In the opening 16 is mounted a clutch wheel 18, the periphery of which is recessed at 19 to receive the rib 17, whereby the clutch wheel is rotatably mounted in the box 15 and at the same time prevented from movement relative to said box. The face of the clutch wheel 18 is provided with a series of projecting pins 20 designed to engage a series of concentrically disposed arcuate depressions 21 in the adjacent face of the box gear 12. The clutch wheel 18 is centrally formed with a squared opening 22 and the driven shaft 11 is formed with a squared portion 23 to snugly fit the squared opening 22 in the clutch wheel. By this construction it is obvious that the clutch wheel 18 is rotated at all times with the shaft 11, and that the box gear 12 may be connected to or disconnected from the shaft by suitable operation of the box 15. The box 15 is operated through the medium of a lever 24 supported at its forward end upon the cross bar 9 and connected at its rear end in an extension 25 leading from the box, and to adapt the operation of the clutch for convenient use by people of different sizes I secure upon the lever 24 an arm 26 connected to said lever through the medium of a slot and pin connection 27, the forward or free end of the arm being deeply recessed at 28. By this connection the arm may be extended varying distances in advance of the cross bar 9 to accommodate the structure to people of different sizes, as will be apparent as the description proceeds.

A sprocket wheel 29 is arranged loose upon the driven shaft 11 about centrally of the latter, being preferably arranged between disk stops to prevent movement of the sprocket wheel longitudinally of the shaft. The shaft 11 at one side of the sprocket wheel is provided with a disk 30 secured upon the shaft and peripherally formed with a series of offsets or teeth 31, the sprocket wheel 29 having a series of spring pressed pawls 32 adapted to engage the teeth 31 of the disk 30. By this construction the operation of the sprocket wheel in one direction will revolve the shaft 11, while rotation of the wheel in the opposite direction is without affect upon the shaft, thus providing for an overrunning of the shaft and for a stopping of the propelling means without stopping the forward movement of the vehicle.

On the side bars 2 of the main frame at the points about midlengths of the latter are secured bearing blocks 33, which extend upwardly from the upper edges of the side bars and support a shaft 34, which is thus arranged transverse the main frame and will be hereinafter termed the driving shaft. Centrally of the driving shaft is secured a main sprocket 35, which is thus alined with the sprocket 29 on the driven shaft, and these sprockets are connected by a chain 36, whereby power is transmitted from the sprocket 35 to the sprocket 29. On each face of the sprocket 34 is secured a disk 37, from which radiates a series of spokes 38 which project beyond the peripheral edge of the sprocket 35 and are connected by a rim 39. The rim 39 and spokes 38 of each side of the sprocket thus constitute a power wheel, in the operation of which by the user of the vehicle the sprocket 35 may be operated with the effect to drive the rear wheels 5 and thereby propel the vehicle. For convenience in such operation the respective rims 39 are provided with relatively outwardly projecting handles 40 arranged in spaced relation around the rim and affording a convenient gripping means for the operator, the handles on one rim being arranged intermediate the positions of the handles on the opposing rim to provide for an alternate pull of the hands in operating the power wheel.

The frame 7 of the forward wheel carries a steering bar 41, which projects beyond the side bars of the main frame and is connected at each end with a push bar 42, which extends lengthwise the main frame and is supported adjacent its rear end on a connecting bar 43 extending laterally from the side bar 2, said connecting bar being, of course, pivotally connected to the push bar and to the main frame. By this construction it will be obvious that the user of the vehicle may conveniently steer the same by pressure upon either of the connecting bars 43, it being understood that the relatively rear end of the push bars 42 are so spaced from the side bars as to permit the foot of the user to rest upon the connecting bars between the push bars and side bars. A brake beam 44 is pivoted upon the side bar 2 of the main frame adjacent one of the rear wheels 5, the outer end of said beam being provided with appropriate means to overlie and brake the tread portion of the particular wheel. A hand lever 45 is connected to the brake beam and pivoted upon one of the frame bars 10, whereby the beam may be operated as desired, as will be obvious. A seat 46 is supported above the axle 4 by means of supports 47 connected to and rising from the side bars 2 of the main frame, said seat being so positioned that the operator may rest his feet on the respective connecting bars 43 and may conveniently grasp the frame or handles of the twin power wheels.

In connection with the steering mechanism described it is noted that the arm 26 terminates immediately adjacent one of the connecting bars 43, so that with the foot of the operator resting upon said connecting bar the leg may rest in the notched portion 28 of the arm 26. By this means the operator may steer the vehicle by pressure upon the connecting bars 43 or may disengage the box gear 12 from connection with the driven shaft 11. Through engagement and disengagement of the box gear 12 with the driven shaft 11 the operator is enabled to either transmit the driving action equally to both rear wheels 5, by engagement of the gear 12 with the driven shaft, or positively drive only one of said wheels by disengagement of the gear 12 from the driven shaft. Turning of the vehicle is thus materially facilitated, and places within the power of the operator a means whereby he may materially assist the control of the vehicle in making sharp or emergency turns.

The operation of the improved vehicle will be readily understood from the above description taken in connection with the drawings, it being understood, however, that the precise details herein described illustrate the preferred embodiment of the invention only and that all changes and variations that may fall within the scope of the appended claim are contemplated as a material and essential part of the invention.

Having thus described the invention what is claimed as new, is:—

A vehicle including a main frame, a steering wheel mounted at one end of the frame, ground wheels mounted at the opposite end of the frame, a driven shaft, means connecting each end of said shaft with one of the ground wheels, one of said means being loose upon the shaft, a clutch connection between said loose means and the shaft, means for controlling the steering wheel, and means for controlling the clutch, said latter means terminating in a notched end arranged adjacent the steering controlling means, said notched end being adapted to engage the leg of the operator so that simultaneous control of the clutch controlling means and steering means is permitted.

In testimony whereof I affix my signature in presence of two witnesses.

NATHAN C. WHITING.

Witnesses:
 CHAS. B. SWOPE,
 RUSSELL E. SWOPE.